US010922652B2

(12) United States Patent
Ma

(10) Patent No.: US 10,922,652 B2
(45) Date of Patent: Feb. 16, 2021

(54) BLOCKCHAIN-BASED PROGRAM REVIEW SYSTEM, METHOD, COMPUTING DEVICE AND STORAGE MEDIUM

(71) Applicant: ADVANCED NEW TECHNOLOGIES CO., LTD., Grand Cayman (KY)

(72) Inventor: Sui Ma, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/876,038

(22) Filed: May 16, 2020

(65) Prior Publication Data

US 2020/0279224 A1  Sep. 3, 2020

Related U.S. Application Data

(63) Continuation of application No. PCT/CN2020/071869, filed on Jan. 14, 2020.

(30) Foreign Application Priority Data

Apr. 16, 2019 (CN) .......................... 2019 1 0305949

(51) Int. Cl.
*G06Q 40/00* (2012.01)
*G06Q 10/10* (2012.01)
(Continued)

(52) U.S. Cl.
CPC ......... *G06Q 10/10* (2013.01); *G06F 16/2379* (2019.01); *G06Q 20/3825* (2013.01);
(Continued)

(58) Field of Classification Search
CPC ............... G06Q 10/10; G06Q 20/3825; G06Q 20/3829; G06Q 20/4014; G06Q 40/08; G06F 16/2379; H04L 9/3247; H04L 63/12
See application file for complete search history.

(56) References Cited

U.S. PATENT DOCUMENTS

| 7,555,439 | B1 * | 6/2009 | Binns | G06Q 50/24 |
| | | | | 705/4 |
| 2008/0183508 | A1 * | 7/2008 | Harker | G06Q 10/10 |
| | | | | 705/4 |

(Continued)

FOREIGN PATENT DOCUMENTS

| CN | 108629565 A | 10/2018 |
| CN | 108985936 A | 12/2018 |

(Continued)

OTHER PUBLICATIONS

Anonymous, "Smart Contracts: 12 Use Cases for Business and Beyond," Digital Chamber of Commerce (Smart Contracts Alliance) (Year: 2016).*

(Continued)

*Primary Examiner* — Alexander G Kalinowski
*Assistant Examiner* — William B. Bunker

(57) ABSTRACT

The specification provides a blockchain-based application review system, method, and storage medium. The blockchain-based application review system comprises: a requesting client, a transaction end, and a blockchain node. The requesting client sends a program purchasing application to the transaction end; the transaction end receives the program purchasing application, determines product information of the target program according to identification information of the target program, and sends a program admission review application to the blockchain node based on identification information of the user and the product information of the (Continued)

target program; the blockchain node receives the program admission review application, executes a program admission review task when an execution condition of a first smart contract is satisfied, generates a corresponding review result, and sends the review result to the transaction end; and the transaction end receives the review result and sends the review result to the requesting client.

20 Claims, 4 Drawing Sheets

(51) Int. Cl.
  *G06F 16/23* (2019.01)
  *H04L 9/32* (2006.01)
  *H04L 29/06* (2006.01)
  *G06Q 20/38* (2012.01)
  *G06Q 20/40* (2012.01)
  *G06Q 40/08* (2012.01)

(52) U.S. Cl.
  CPC ..... *G06Q 20/3829* (2013.01); *G06Q 20/4014* (2013.01); *G06Q 40/08* (2013.01); *H04L 9/3247* (2013.01); *H04L 63/12* (2013.01); *G06Q 2220/00* (2013.01)

(56) References Cited

U.S. PATENT DOCUMENTS

| | | | |
|---|---|---|---|
| 2009/0048877 A1* | 2/2009 | Binns | G06F 19/328 705/4 |
| 2009/0106054 A1* | 4/2009 | Sarel | G06Q 40/08 705/4 |
| 2015/0348169 A1 | 12/2015 | Harris et al. | |
| 2016/0292672 A1 | 10/2016 | Fay et al. | |
| 2016/0342989 A1 | 11/2016 | Davis | |
| 2016/0342994 A1 | 11/2016 | Davis | |
| 2017/0011392 A9 | 1/2017 | Lingham et al. | |
| 2017/0103468 A1 | 4/2017 | Orsini et al. | |
| 2017/0103472 A1 | 4/2017 | Shah | |
| 2017/0154331 A1 | 6/2017 | Voorhees | |
| 2017/0206523 A1 | 7/2017 | Goeringer et al. | |
| 2017/0236094 A1 | 8/2017 | Shah | |
| 2017/0286880 A1 | 10/2017 | Wiig et al. | |
| 2017/0310653 A1 | 10/2017 | Zhang | |
| 2017/0331624 A1 | 11/2017 | Samid | |
| 2017/0337534 A1 | 11/2017 | Goeringer et al. | |
| 2017/0366353 A1 | 12/2017 | Struttmann | |
| 2017/0372278 A1 | 12/2017 | Frolov et al. | |
| 2018/0165598 A1* | 6/2018 | Saxena | G06N 3/006 |
| 2018/0218456 A1* | 8/2018 | Kolb | G06Q 30/08 |
| 2018/0285979 A1* | 10/2018 | Chessell | G06Q 40/08 |
| 2018/0344215 A1* | 12/2018 | Ohnemus | A63F 13/798 |
| 2018/0350451 A1* | 12/2018 | Ohnemus | G16H 10/60 |
| 2019/0050855 A1* | 2/2019 | Martino | H04L 9/0643 |
| 2020/0005213 A1* | 1/2020 | Clemens | G06Q 40/08 |
| 2020/0020038 A1* | 1/2020 | Haile | G16H 50/20 |
| 2020/0034919 A1 | 1/2020 | Qiu et al. | |
| 2020/0167870 A1* | 5/2020 | Isaacson | G06Q 40/08 |
| 2020/0177386 A1* | 6/2020 | Mahmood | H04L 9/0637 |
| 2020/0302523 A1* | 9/2020 | Cella | G06Q 10/10 |

FOREIGN PATENT DOCUMENTS

| | | | | |
|---|---|---|---|---|
| CN | 109003192 | * | 12/2018 | ............ G06Q 40/08 |
| CN | 109003192 A | | 12/2018 | |
| CN | 109214883 A | | 1/2019 | |
| CN | 109543447 A | | 3/2019 | |
| CN | 109615529 A | | 4/2019 | |
| CN | 110246044 A | | 9/2019 | |
| WO | WO-2019179035 A1 | * | 9/2019 | ............ G06Q 50/02 |
| WO | WO-2020056975 A1 | * | 3/2020 | |
| WO | WO-2020062326 A1 | * | 4/2020 | ............ G16H 50/30 |

OTHER PUBLICATIONS

Indranil Nath, "Data Exchange Platform to Fight Insurance Fraud on Blockchain," IEEE 16th International Conference on Data Mining Workshops, IEEE Computer Society (Year: 2016).*
First Search for Chinese Application No. 201910305949.5 dated Mar. 31, 2020.
First Office Action for Chinese Application No. 201910305949.5 dated Apr. 8, 2020.
Second Office Action for Chinese Application No. 201910305949.5 dated May 18, 2020.
Written Opinion and International Search Report for PCT Application No. PCT/CN2020/071869 made available to public on Oct. 22, 2020.

* cited by examiner

US 10,922,652 B2

BLOCKCHAIN-BASED PROGRAM REVIEW SYSTEM, METHOD, COMPUTING DEVICE AND STORAGE MEDIUM

CROSS REFERENCE TO RELATED APPLICATIONS

The present application is a continuation application of International Patent Application No. PCT/CN2020/071869, filed on Jan. 14, 2020, which claims priority to Chinese Patent Application No. 201910305949.5, filed on Apr. 16, 2019. The entire content of the above referenced applications are incorporated herein by reference.

TECHNICAL FIELD

The specification relates to the field of Internet technologies, and in particular, to a blockchain-based service purchasing/program enrollment review system, method, computing device and storage medium.

BACKGROUND

Along with the continuous economic development, insurance has become an important component of life. Insurance underwriting is a process by an insurance company to review, approve and select a risk of an insurance application from an insured. After a user sends an insurance application to an insurance company, the insurance company needs to perform underwriting for the user to achieve long-term underwriting profits.

In the current technologies, due to the development of the Internet, many insurance companies have realized, to a certain extent, automatic underwriting through a system. Namely, an underwriting rule is preset, and the system automatically determines whether a user satisfies the rule. However, since different companies or organizations playing different roles in the Internet system possess data of users in different fields, it takes a long time for an insurance company to collect these data, and moreover, it is impossible to ensure that the collected data is always true data that has not been tempered with. As a result, it is impossible to guarantee that underwriting results obtained from automatic underwriting through the system are accurate.

SUMMARY

In view of this, embodiments of the specification provide a blockchain-based program joining (or a service purchasing, a service enrolling) application review system, method, computing device and storage medium, so as to solve the technical defects of the current technologies.

According to a first aspect of the embodiments of the specification, a method for blockchain-based product-purchasing application review is provided. The method may comprise: obtaining, by a blockchain node, a plurality of underwriting rules associated with a plurality of products from a plurality of product providers, each underwriting rule comprising a user score required to purchase a corresponding product; constructing, by the blockchain node, a first smart contract based on the plurality of underwriting rules associated with the plurality of products; obtaining, by the blockchain node, a plurality of assessment rules to calculate a change to a user score of a given user based on historical transaction data of the given user; constructing, by the blockchain node, a second smart contract based on the plurality of assessment rules; signing, by the blockchain node, the first smart contract and the second smart contract respectively with a private key of the blockchain node and submitting the signed first smart contract and the signed second smart contract to a blockchain network; after the first smart contract and the second smart contract are validated based on a public key of the blockchain node, broadcasting, by the blockchain node, the first smart contract and the second smart contract to the blockchain network; receiving a user's transaction data from a third party service provider; determining, by the blockchain node executing the second smart contract, a user score for the user based on the user's transaction data; storing, by the blockchain node, the user score of the user in the blockchain network, wherein the user score of the user is indexed based on identification information of the user; receiving, by the blockchain node, a product-purchasing application review request comprising the identification information of the user and product information of a target product; retrieving, by the blockchain node, the user score of the user based on the identification information of the user in the product-purchasing application review request; and generating, by the blockchain node executing the first smart contract, a review result based on the retrieved user score of the user and the product information of the target product in the product-purchasing application review request.

In some embodiments, the broadcasting the second smart contract to the blockchain network comprises: consolidating the second smart contract into a block and broadcasting the block to the blockchain network.

In some embodiments, the determining a user score for the user based on the user's transaction data comprises: determining if an execution condition of the second smart contract is satisfied; if so, automatically processing the user's transaction data according to the one or more assessment rules to generate a user-score change for the user, wherein the user-score change implies an amplitude of score increase or score decrease; retrieving a current user score of the user from the blockchain network; determining an updated user score of the user based on the current user score and the user-score change; and storing the updated user score in the blockchain network, the updated user score being retrievable based on the identification information of the user.

In some embodiments, the method may further comprise: determining if the product information of the target product satisfies an execution condition of the first smart contract.

In some embodiments, the generating a review result based on the retrieved user score of the user and the product information of the target product in the product-purchasing application review request comprises: determining, by the blockchain node executing the first smart contract, the user score required to purchase the target product based on the product information of the target product in the product-purchasing application review request; and generating, by the blockchain node executing the first smart contract, the review result based on a comparison of the retrieved user score with the user score required to purchase the target product.

In some embodiments, the method may further comprise monitoring whether a state machine, an event and/or a trigger condition in the first smart contract satisfies a preset execution condition, and if yes, an execution condition of the first smart contract is satisfied.

In some embodiments, the method may further comprise monitoring whether a state machine, an entity and/or a trigger condition in the second smart contract satisfies a preset execution condition, and if yes, an execution condition of the second smart contract is satisfied.

In some embodiments, the method may further comprise sending, if the review result comprises an approval, a service purchasing request to a server of a provider offering the target product, the service purchasing request comprising the identification information of the user and an identification information of the target product, receiving a purchase confirmation from the sever of the provider, and sending a notification of successful purchase to the user.

In some embodiments, the method may further comprise sending, if the review result comprises a rejection, a notification of failure to the user.

According to a second aspect of the embodiments of the specification, a system for blockchain-based product-purchasing application review is provided. The system may be configured with instructions executable by one or more processors to cause the one or more processors to perform operations comprising: obtaining, by a blockchain node, a plurality of underwriting rules associated with a plurality of products from a plurality of product providers, each underwriting rule comprising a user score required to purchase a corresponding product; constructing, by the blockchain node, a first smart contract based on the plurality of underwriting rules associated with the plurality of products; obtaining, by the blockchain node, a plurality of assessment rules to calculate a change to a user score in response to historical transaction data of a given user; constructing, by the blockchain node, a second smart contract based on the plurality of assessment rules; signing, by the blockchain node, the first smart contract and the second smart contract respectively with a private key of the blockchain node and submitting the signed first smart contract and the signed second smart contract to a blockchain network; after the first smart contract and the second smart contract are validated based on a public key of the blockchain node, broadcasting, by the blockchain node, the first smart contract and the second smart contract to the blockchain network; receiving a user's transaction data from a third party service provider; determining, by the blockchain node executing the second smart contract, a user score for the user based on the user's transaction data; storing, by the blockchain node, the user score of the user in the blockchain network, wherein the user score of the user is indexed based on identification information of the user; receiving, by the blockchain node, a product-purchasing application review request comprising the identification information of the user and product information of a target product; retrieving, by the blockchain node, the user score of the user based on the identification information of the user in the product-purchasing application review request; and generating, by the blockchain node executing the first smart contract, a review result based on the retrieved user score of the user and the product information of the target product in the product-purchasing application review request.

According to a third aspect of the embodiments of the specification, a storage medium for blockchain-based product-purchasing application review is provided. The storage medium may comprise a processor and a non-transitory computer-readable storage medium storing instructions executable by the processor to cause the system to perform operations comprising: obtaining, by a blockchain node, a plurality of underwriting rules associated with a plurality of products from a plurality of product providers, each underwriting rule comprising a user score required to purchase a corresponding product; constructing, by the blockchain node, a first smart contract based on the plurality of underwriting rules associated with the plurality of products; obtaining, by the blockchain node, a plurality of assessment rules to calculate a change to a user score in response to historical transaction data of a given user; constructing, by the blockchain node, a second smart contract based on the plurality of assessment rules; signing, by the blockchain node, the first smart contract and the second smart contract respectively with a private key of the blockchain node and submitting the signed first smart contract and the signed second smart contract to a blockchain network; after the first smart contract and the second smart contract are validated based on a public key of the blockchain node, broadcasting, by the blockchain node, the first smart contract and the second smart contract to the blockchain network; receiving a user's transaction data from a third party service provider; determining, by the blockchain node executing the second smart contract, a user score for the user based on the user's transaction data; storing, by the blockchain node, the user score of the user in the blockchain network, wherein the user score of the user is indexed based on identification information of the user; receiving, by the blockchain node, a product-purchasing application review request comprising the identification information of the user and product information of a target product; retrieving, by the blockchain node, the user score of the user based on the identification information of the user in the product-purchasing application review request; and generating, by the blockchain node executing the first smart contract, a review result based on the retrieved user score of the user and the product information of the target product in the product-purchasing application review request.

In the embodiments of the specification, the review process is carried out in a blockchain network, which ensures the openness of the application review process and improves the credibility of the review result. Moreover, the deployment of the program admission review rule is carried out through a first smart contract, which ensures the stability of the application review system.

DETAILED DESCRIPTION

Exemplary embodiments are described below to facilitate thorough understanding of the present application. However, the present application may be implemented in many other manners different from the description herein. Those skilled in the art may make similar extensions without departing from the connotation of the present application. Therefore, the present application is not limited by the exemplary embodiments disclosed below.

Terms used in one or more embodiments of the specification are only for the purpose of describing particular embodiments, rather than limiting one or more embodiments of the specification. "A," "the," and "said" in the singular form used in one or more embodiments of the specification and the appended claims are intended to include the plural form as well, unless clearly indicated in the context to have other meanings. The term "and/or" used in one or more embodiments of the specification refers to and includes any or all possible combinations of one or more associated listed items.

Terms such as first, second, and the like may be used in one or more embodiments of the specification to describe various information, but the information shall not be limited to these terms. These terms are only used to differentiate information of the same type from each other. For example, without departing from the scope of one or more embodiments of the specification, first may also be referred to as second, and similarly, second may also be referred to as first. Depending on the context, the term "if" used here may be construed as "when . . . " or "at the time of . . . " or "in response to determination."

First, terms involved in one or more embodiments of the specification will be explained. Blockchain is a novel application mode of computer technologies, such as distributed data storage, point-to-point transmission, consensus mechanisms, and encryption algorithms. Smart contract can be understood as a computer protocol intended to broadcast, verify or execute a contract in an information technology manner. A smart contract allows trusted transactions without a third party, and these transactions are trackable and irreversible.

Insurance underwriting refers a process by an insurance company to review, approve and select a risk of an insurance application from an insured. Underwriter normally is a professional working on underwriting inside an insurer.

A blockchain-based application review system, method, computing device and storage medium are provided in the specification, which will be described in detail one by one in the following embodiments.

Figure 1:
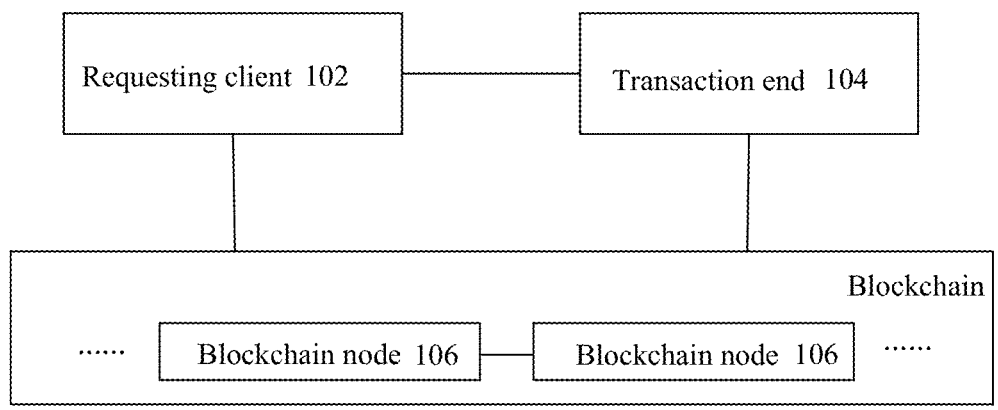
FIG. 1 is a schematic diagram of a blockchain-based application review system according to some embodiments of the present application.

FIG. 1 is a schematic diagram of a blockchain-based application review system according to some embodiments of the specification. The system comprises: a requesting client 102, a transaction end 104, and at least one blockchain node 106.

The requesting client 102 is configured to send a program joining (or a service purchasing, a service enrolling) application to the transaction end, the program joining application comprising identification information of a user and identification information of a target program. Here, the "transaction end" 140 may refer to a computing device, a computing system, a server that communicates with the requesting client 102 and the at least one blockchain node 106; the "program" may be understood as a product, a service (e.g., life insurance, car insurance, or another suitable insurance), or a combination of product and service; the "program joining application" may refer to a service/insurance enrollment application, request to join an insurance program, or request to purchase an insurance product. The "program," "product," and "service" may be used interchangeable unless the context clearly indicates to the contrary.

The transaction end 104 is configured to receive the program joining application, determine product information of the target program according to the identification information of the target program, and send a program admission review application to the blockchain node based on identification information of the user and the product information of the target program.

The blockchain node 106 is configured to receive the program admission review application, execute a program admission review task when an execution condition of a first smart contract in the blockchain node is satisfied, generate a corresponding review result, and send the review result to the transaction end 104.

The transaction end 104 is further configured to receive the review result and send the review result to the requesting client 102.

In some embodiments, the blockchain-based application review system further comprises: a third-party service platform. The third-party service platform may be configured to obtain the identification information and transaction data of the user and initiate a user score assessment request to the blockchain node, the user score assessment request comprising the identification information and the transaction data of the user. Here, a user score may refer to a method for rating the user (e.g., based on the user's credit score, transactional history). The specification does not limit the way how the user score is determined. Terms "user score" and "user rating" may be used interchangeably unless the context clearly suggests contrary.

In some embodiments, the blockchain node is further configured to receive the user score assessment request, execute the level assessment task when an execution condition of a second smart contract in the blockchain node is satisfied, generate a corresponding execution result, and carry out level update for the user based on the execution result.

In some embodiments, the blockchain node is further configured to obtain the identification information and the transaction data of the user in the user score assessment request, automatically process the transaction data of the user according to a user score assessment rule when the execution condition of the second smart contract in the blockchain node is satisfied, generate a result of level change of the user, and carry out level update for the user according to the result of level change of the user.

In some embodiments, the blockchain node is further configured to obtain the identification information of the user and the product information of the target program in the program admission review application, compare the level of the user and the level of the target program according to a program admission review rule when information contained in the product information of the target program satisfies the execution condition of the first smart contract in the blockchain node, generate a corresponding comparison result, and send the comparison result to the transaction end 104.

In some embodiments, the blockchain node is further configured to obtain program admission review rules, and create the first smart contract according to the program admission review rules; submit the first smart contract signed with a private key into a blockchain network; validate the first smart contract submitted into the blockchain network; and when the validation of the first smart contract is successful, consolidate the first smart contract into a block, and broadcast the block to the entire network.

In some embodiments, the blockchain node is further configured to obtain transaction data, determine one or more user score assessment rules according to the transaction data, create the second smart contract according to the user score assessment rules, and submit the second smart contract signed with a private key into a blockchain network; validate the second smart contract submitted into the blockchain network; and when the validation of the second smart contract is successful, consolidate the second smart contract into a block, and broadcast the block to the entire network.

In some embodiments, the blockchain node is further configured to monitor whether a state machine, an entity and/or a trigger condition in the first smart contract and/or the second smart contract satisfies a preset execution condition, and if yes, the first smart contract and/or the second smart contract satisfies the execution condition.

In some embodiments, the blockchain-based application review system further comprises: a server, wherein the transaction end 104 is further configured to send, if the review result is that the review is successful (e.g., approval), a program acceptance request to the server, the program acceptance request comprising the identification information of the user and the identification information of the target program; the server is configured to receive the program acceptance request, carry out acceptance of the target program of the user according to the identification information of the user and the identification information of the target program, and send an acceptance result to the transaction end 104; and the transaction end 104 is further configured to receive the acceptance result, and send a notification of successful program acceptance to the requesting client 102.

In some embodiments, the transaction end 104 is further configured to send, if the review result is that the review is failure (e.g., a rejection), a notification of application review failure to the requesting client 102.

In some embodiments, the participation of multiple institutions in the application review ensures the thoroughness and accuracy of user data, improves the accuracy of the application review result, and also improves the efficiency of the application review process.

Figure 2:
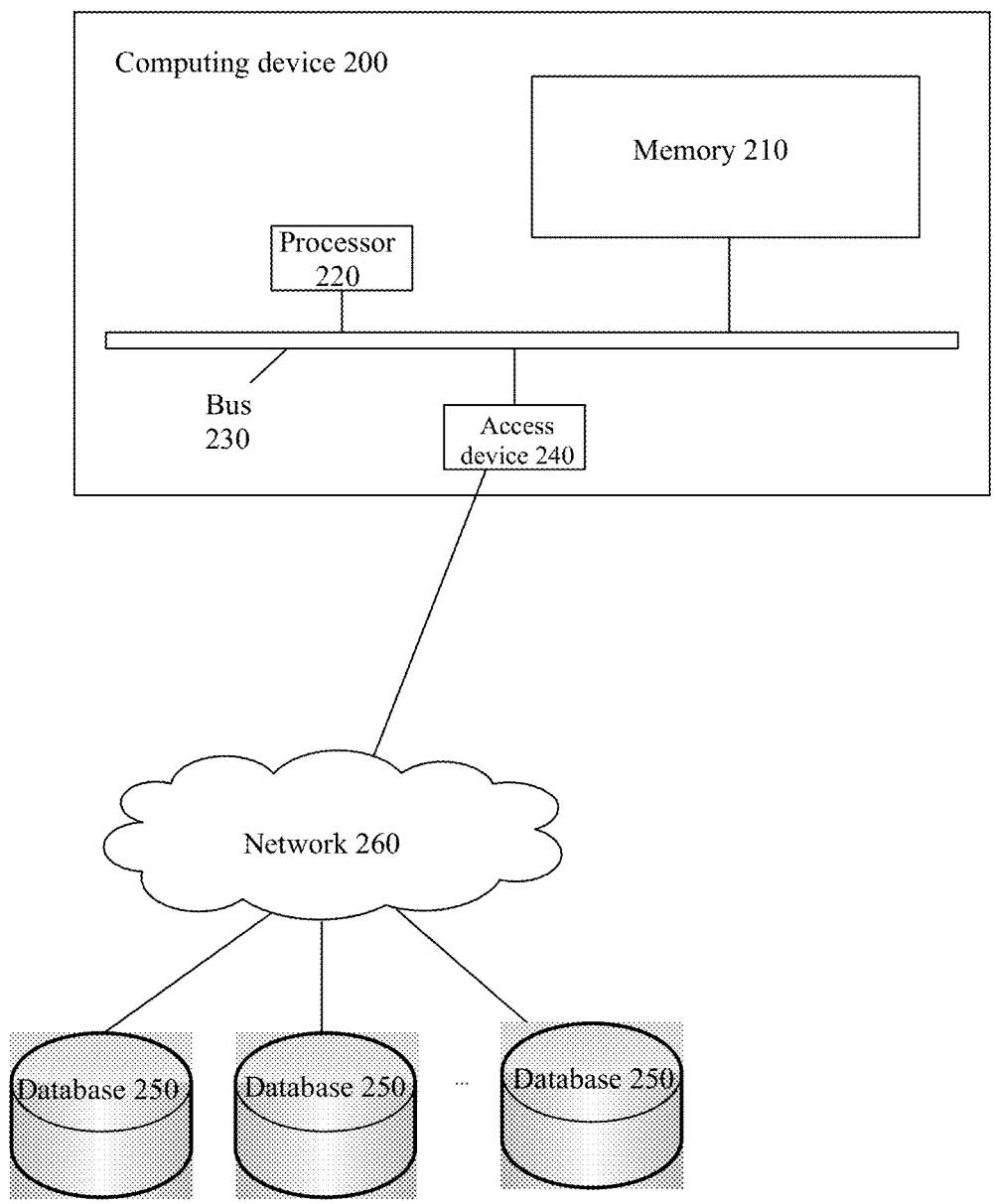
FIG. 2 is a structural block diagram of a computing device according to some embodiments of the present application.

FIG. 2 is a structural block diagram of a computing device 200 according to some embodiments of the present application. The computing device 200 comprises components that include, but are not limited to, a memory 210 and a processor 220. The processor 220 and the memory 210 are connected via a bus 230, and a database 250 is configured to store data.

The computing device 200 further comprises an access device 240. The access device 240 enables the computing device 200 to communicate via one or more networks 260. Examples of these networks include a public switched telephone network (PSTN), a local area network (LAN), a wide area network (WAN), a personal area network (PAN), or a combination of communication networks like the Internet. The access device 240 may comprise one or more of any type of wired or wireless network interfaces (e.g., one or more of network interface cards (NIC)), such as an IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, a near field communication (NFC) interface, etc.

In some embodiments, the above components of the computing device 200 and other components not shown in FIG. 2 may also be connected with each other, for example, via a bus. The structural block diagram of the computing device shown in FIG. 2 is for exemplary purpose only, rather than a limitation to the scope of the present application. Those skilled in the art may add or replace with other components as needed.

The computing device 200 may be a static or mobile computing device of any type, comprising a mobile computer or a mobile computing device (for example, a tablet computer, a personal digital assistant, a laptop computer, a notebook computer, a netbook, etc.), a mobile phone (for example, a smart phone), a wearable computing device (for example, a smart watch, smart glasses, etc.) or other types of mobile devices, or a static computing device, such as a desktop computer or PC. The computing device 200 may also be a mobile or static server.

Figure 3:
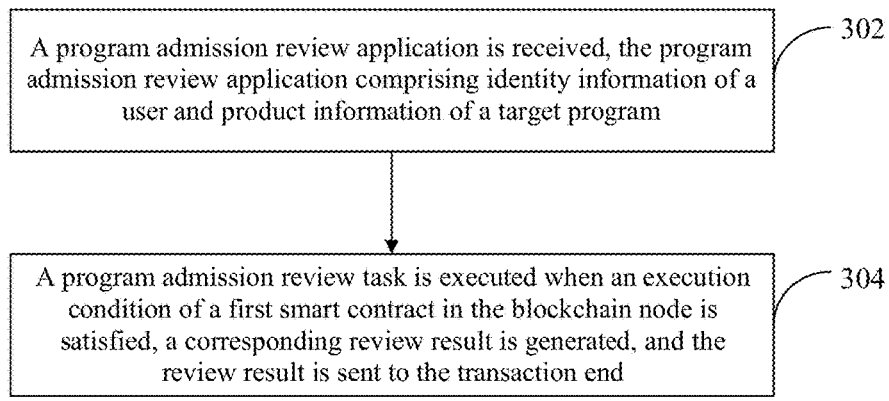
FIG. 3 is a flow chart of a blockchain-based application review method according to some embodiments of the present application.

Here, the processor 220 may implement steps of the blockchain-based application review method as shown in FIG. 3. FIG. 3 is a flow chart of a blockchain-based application review method according to some embodiments of the present application. The method comprises Step 302 to Step 304.

In Step 302, a program admission review application is received, the program admission review application comprising identification information of a user and product information of a target program. Here, the target program may refer to an insurance product.

In some embodiments, a user sends a program joining (e.g., insurance purchasing) application to a transaction end, the program joining application comprising identification information of the user and identification information of a target program. Upon receiving the program joining application, the transaction end determines product information of the target program according to the identification information of the target program, and sends a program admission review application (e.g., product-purchasing application review request) to a blockchain node based on identification information of the user and the product information of the target program.

Taking insurance as an example, Zhang San wants to buy a health insurance B from an insurance company A and sends an insurance application to the insurance company A. Upon receiving the insurance application, the insurance company A obtains product information of the health insurance B, including an insured amount, a disease coverage, a risk level, and other information, and sends the information and identification information of the user to the blockchain node for underwriting.

In some embodiments, before receiving a program admission review application, the blockchain node needs to first create a first smart contract, and the first smart contract is used for automatically executing a program admission review task. The creating a first smart contract and writing the first smart contract into a blockchain network may be implemented, for example, by the following steps: obtaining program admission review rules, and creating the first smart contract according to the program admission review rules; submitting the first smart contract signed with a private key into a blockchain network; validating the first smart contract submitted into the blockchain network; and when the validation of the first smart contract is successful, consolidating the first smart contract into a block, and broadcasting the block to the entire network.

Taking insurance programs as an example, different insurances have different program admission review rules. Therefore, the created first smart contract contains program admission review rules for N insurance programs, wherein N is a positive integer. In insurance programs, different insurances have different sums insured and underwriting risk factors. For example, for health insurance, the insured amount is in positive correlation with the risk factor, while accident insurance, as a whole, has a relatively high insured amount and very low probability of actual insurance claims, and therefore, the risk factor is relatively small. To determine a program admission review rule, the risk factor of an actual insurance needs to be determined according to the insurance, and a program admission review rule corresponding to this insurance is determined according to the risk factor. For example, if a user purchases an auto insurance C with an insured amount of 20,000 Yuan and a risk factor of 3 (the risk factor is 1-10, where a higher factor indicates a higher underwriting risk), then the set program admission review rule may require that the user score is above Level 3 (the user score is a credit level of a user that is set to 1-10, where a higher level indicates a higher credit and lower probability of insurance claims).

In the application review process, a corresponding application review rule may be obtained based on the product information of the target program that the user is applying for, and an underwriting operation is performed for the user according to the application review rule. For example, after receiving a program admission review application and before automatically executing a program admission review task, whether a state machine, an entity and/or a trigger condition in the first smart contract satisfies a preset execution condition needs to be monitored. If the preset execution condition is satisfied, it indicates that the first smart contract satisfies the automatic execution condition, and an underwriting operation may be automatically executed on the user.

In Step 304, a program admission review task is executed when an execution condition of a first smart contract in the blockchain node is satisfied, a corresponding review result is generated, and the review result is sent to the transaction end.

In some embodiments, the identification information of the user and the product information of the target program in the program admission review application are obtained. The identification information of the user may be used to retrieve the user's user score. In some embodiments, users' user scores are stored in the blockchain network. For example, a user may be assigned with a default user score stored in the blockchain network. When transaction data associated with the user is received from a third party service provider (e.g., medical institutions, loan institutions, or utility companies), the user's user score may be updated accordingly. Since data stored in the blockchain network cannot be altered, the updated user score for the user may be stored as a new record and associated with the user's identification information.

When information contained in the product information of the target program satisfies the execution condition of the first smart contract in the blockchain node, the level of the user and the level of the target program are compared according to a program admission review rule and generating a corresponding comparison result. Taking auto insurance as an example, if a user purchases an auto insurance C with an insured amount of 20,000 Yuan and a risk factor of 3, and the program admission review rule set for the auto insurance C in the first smart contract is that the user score is Level 3 and above, an underwriting admission review is performed on the user according to the above-described information. If the credit level of the user is Level 5, the review result is that the review is successful (e.g., approval). If the credit level of the user is below Level 3, then the review result is that the review is failure (e.g., rejection).

In some embodiments, if the review is successful, a notification of successful review is sent to the transaction end, and then the transaction end sends a program acceptance request to the server, the program acceptance request comprising the identification information of the user and the identification information of the target program. The server receives the program acceptance request, carries out acceptance of the target program of the user according to the identification information of the user and the identification information of the target program, and sends an acceptance result to the transaction end. Lastly, the transaction end sends a notification of successful program acceptance to the requesting client. If the review is failure, the transaction end directly sends a notification of review failure to the requesting client.

In some embodiments, before receiving a program admission review application, the blockchain node further needs to assess the level of the user. The blockchain node may store or provide an initial score for the user, which may be updated by a user score assessment process. Here, the "update" may refer to create a new record of the updated user score in the blockchain network. The user score assessment process may be implemented, for example, by the following steps: receiving the user score assessment request; executing the level assessment task when an execution condition of a second smart contract in the blockchain node is satisfied, and generating a corresponding execution result; and carrying out level update for the user based on the execution result.

In some embodiments, the second smart contract in the blockchain node is used to calculate an amplitude of change to a user score, automatically process the transaction data of the user according to a user score assessment rule preset in the second smart contract when the execution condition of the second smart contract is satisfied, and generate a result of level change of the user.

The third-party service platform sends the user score assessment request to the blockchain node, the user score assessment request comprising the transaction data of the user. Continually using the insurance program as an example, and assuming that the third-party service platform is a medical organization, then the transaction data is medical treatment data. The blockchain node automatically processes the medical treatment data according to a user score assessment rule preset in the second smart contract to generate a result indicating that the level of the user is lowered by one level, and carries out level update for the user based on the result.

In some embodiments, before receiving the user score assessment request, the method further comprises: receiving a plurality of user score assessment rules (e.g., from a plurality of service providers of a same industrial sector); creating the second smart contract according to the user score assessment rules, and submitting the second smart contract signed with a private key into a blockchain network; validating the second smart contract submitted into the blockchain network; and when the validation of the second smart contract is successful, consolidating the second smart contract into a block, and broadcasting the block to the entire network.

Continually using the insurance program as an example, a user's credit level is lowered if the user has a medical treatment record, and the specific amplitude of the credit level decreasing is determined according to the user's medical treatment record. The second smart contract is created according to the user score assessment rule, and the second smart contract is written into the blockchain network.

In some embodiments, the second smart contract may update a user's user score when a new set of transaction data of the user is received from a third party service provider (e.g., a new medical record of the user is received from a hospital). For example, the user's current user score may first be retrieved based on the identification of the user from the blockchain network. Then the second smart contract may be executed based on the received transaction data of the user to determine a change to the user's user score. Based on the user's current user score and the determined change, an updated user score may be determined. The updated user score may be stored in the blockchain network and indexed by the identification information of the user. When a product-purchasing request is received (the request comprising the identification information of the user and the product information of a target product), the first smart contract may first retrieve the user's up-to-date user score from the blockchain network based on the identification information of the user, and then determines whether the user is allowed to purchase the target product.

In some embodiments, deploying the user score assessment rules in the form of the second smart contract in the blockchain network effectively guarantees the security, reliability, and timeliness of user score data. For example, if the user applied a loan from a bank, the loan information (e.g., loan amount, term, repayments) may be timely submitted to the blockchain to update the user's credit level according to corresponding user score assessment rules. As another example, if the user had a treatment in a hospital, the relevant information (e.g., illness, type of treatment, sequela) may be submitted to the blockchain to update the user's health level according to corresponding user score assessment rules. It may be appreciated that a user may have various user scores, such as credit level (e.g., for applying for a loan or credit card), health level (e.g., for applying for a health insurance), driving experience level (e.g., for applying for an auto insurance), military service tenure level (e.g., for applying for limitary discount for purchases). In traditional systems, storing these user scores and timely updating these user scores may be impossible because a trusted party needs to exist, and it may be impractical to gain the trust from various service/produce providers across different industries. In the embodiments disclosed in this specification, the blockchain and the involved smart contracts create such a "trusted system" because of the features such as decentralization, enhanced security and privacy, consensus, faster settlement, fault tolerance, attack resistance, free of scams, and lower transaction costs. Thus, the operations performed in the disclosed embodiments are impossible for traditional systems to carry out.

In some embodiments, by deploying the program admission review rules in the form of the first smart contract in the blockchain network, the authority and openness of the application review process in the blockchain network is ensured. The participation of multiple institutions in the program admission review process ensures the thoroughness and accuracy of user data and improves the credibility of the program admission review result.

Figure 4:
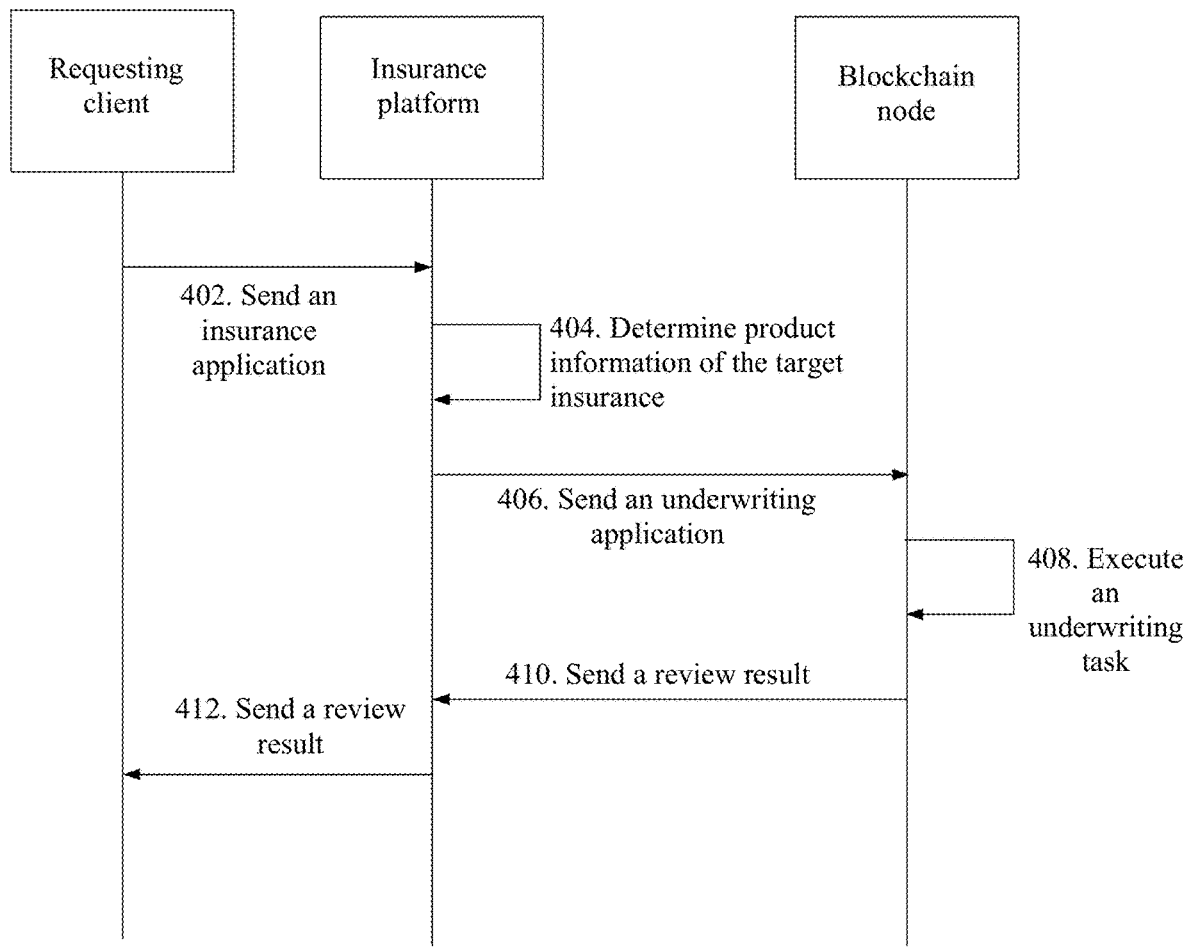
FIG. 4 is a schematic diagram of interactions using the blockchain-based application review method in an application scenario of an insurance program according to some embodiments of the present application.

FIG. 4 is a schematic diagram of interactions using the blockchain-based application review method in an application scenario of an insurance program according to some embodiments of the present application. The method comprises Step 402 to Step 412.

In Step 402, a requesting client sends an insurance application to an insurance platform.

In some embodiments, the insurance application carries identification information of a user and identification information of a target insurance. For example, Xiao K wants to buy an auto insurance D, then Xiao K sends, via the requesting client, identification information of the auto insurance D and identification information of Xiao K to the insurance platform to purchase the insurance.

In Step 404, the insurance platform determines product information of the target insurance.

In Step 406, the insurance platform sends an underwriting application to a blockchain node. In some embodiments, upon receiving the insurance application from Xiao K, the insurance platform determines, according to the identification information of the auto insurance D, product information of the auto insurance D, including an insured amount, a coverage, and a risk factor, and sends the identification information of Xiao K and the product information of the auto insurance D to the blockchain node for underwriting.

In Step 408, the blockchain node executes an underwriting task. In some embodiments, upon receiving the underwriting application, the blockchain node obtains the identification information of Xiao K and the product information of the auto insurance D in the underwriting review application, compares the level of the user and the level required for purchasing the auto insurance D according to an underwriting rule when an execution condition of a first smart contract in the blockchain node is satisfied, generates a corresponding comparison result, and sends the comparison result to the insurance platform.

In some embodiments, before receiving the underwriting application, the blockchain node needs to first create the first smart contract, and the first smart contract is used for automatically executing an underwriting task. The creating the first smart contract and writing the first smart contract into a blockchain network may be implemented, for example, by the following steps: obtaining underwriting rules of various insurances, and creating the first smart contract according to the underwriting rules of various insurances; submitting the first smart contract signed with a private key into a blockchain network; validating the first smart contract submitted into the blockchain network; and when the validation of the first smart contract is successful, consolidating the first smart contract into a block, and broadcasting the block to the entire network.

In some embodiments, different insurance programs have different program admission review rules. Therefore, the created first smart contract contains program admission review rules for N insurance programs, wherein N is a positive integer. In addition, different insurances have different insured amounts and underwriting risk factors. For example, for health insurance, the insured amount is in positive correlation with the risk factor, while accident insurance, as a whole, has a relatively high insured amount and very low probability of actual insurance claims, and therefore, the risk factor is relatively small. To determine an underwriting rule, the risk factor of an actual insurance needs to be determined according to this insurance, and an underwriting rule corresponding to this insurance is determined according to the risk factor.

In the underwriting process, a corresponding underwriting rule is obtained based on the product information of the auto insurance that the user is applying for, and an underwriting operation is performed on the user according to the underwriting rule. For example, after receiving an underwriting application and before automatically executing an underwriting task, whether a state machine, an entity and/or a trigger condition in the first smart contract satisfies a preset execution condition needs to be monitored. If the preset execution condition is satisfied, it indicates that the first smart contract satisfies the automatic execution condition, and an underwriting operation may be automatically executed on the user.

In Step 410, the blockchain node sends a review result to the insurance platform.

In some embodiments, the first smart contract may be executed to first determine the user score required to purchase the target product based on the product information of the target product in the product-purchasing application review request, and then generate the review result based on a comparison of the retrieved user score with the user score required to purchase the target product. For example, the insurances that Xiao K wants to purchase is the auto insurance D with an insured amount of 50,000 Yuan and a risk factor of 5, and the program admission rule for the auto insurance D set in the first smart contract is that the user score is 5 and above, the underwriting is performed on Xiao K according to the information above. If the credit level of Xiao K is Level 6, the review result is that the review is successful. If the credit level of the user is below Level 5, then the review result is that the review is failure.

In Step 412, the insurance platform sends a review result to the requesting client.

In some embodiments, if the review is successful, a notification of successful review is sent to the insurance platform, and then the insurance platform sends an insurance acceptance request to the insurance company, the insurance acceptance request comprising the identification information of Xiao K and the identification information of the auto insurance D. The insurance company receives the insurance acceptance request, carries out acceptance of the auto insurance D for Xiao K according to the identification information of Xiao K and the identification information of the auto insurance D, and sends an acceptance result to the insurance platform. Lastly, the insurance platform sends a notification of successful acceptance of the auto insurance D to the requesting client. If the review is failure, the insurance platform directly sends a notification of review failure to the requesting client.

In some embodiments, the program admission review process is carried out at the blockchain node, which ensures the openness of the review process and improves the credibility of the review result. Moreover, the deployment of the program admission review rules is carried out through the first smart contract, which ensures the stability of the program admission review system. It may be appreciated that the program admission review rules may be associated with various products/programs/services from various vendors. Before blockchain technologies, it may be impossible to create a system that all the vendors trust and are willing to submit its application review rules (e.g., criteria or conditions) to. In the embodiments disclosed in this specification, the blockchain and the involved smart contracts create such a "trusted system" because of the features such as decentralization, enhanced security and privacy, consensus, faster settlement, fault tolerance, attack resistance, free of scams, and lower transaction costs. Thus, the operations performed in the disclosed embodiments are impossible for traditional systems to carry out.

The user score assessment rule is deployed, in the form of the second smart contract, in the blockchain network, which effectively guarantees the security, reliability, and timeliness of user score data. By deploying the program admission review rule, in the form of the first smart contract, in the blockchain network, the authority and openness of the application review process in the blockchain network is ensured. The participation of multiple institutions in the program admission review process ensures the thoroughness and accuracy of user data and improves the credibility of the program admission review result.

Figure 5:
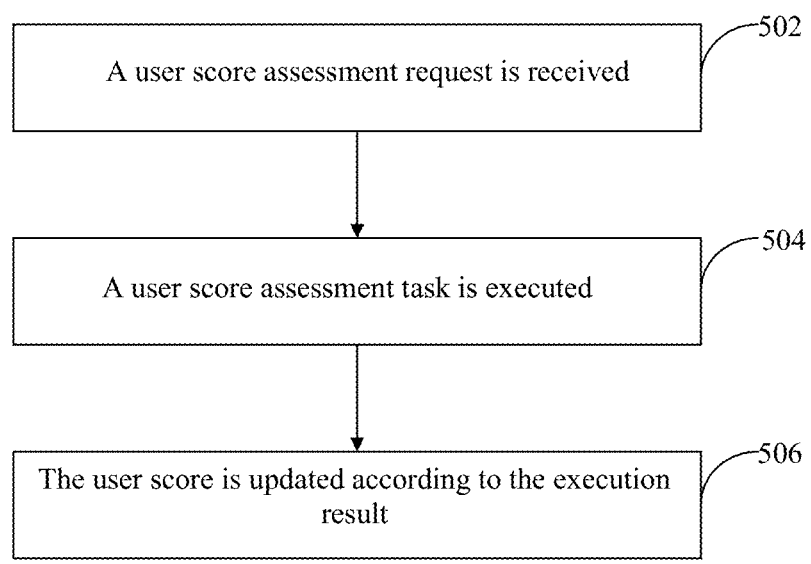
FIG. 5 is a flow chart of a user score assessment process in the blockchain-based application review method according to some embodiments of the present application.

FIG. 5 is a flow chart of a user score assessment process in the blockchain-based application review method according to some embodiments of the present application. The method comprises Step 502 to Step 506.

In Step 502, a user score assessment request is received.

In some embodiments, taking the third-party service platform being a bank as an example, the transaction data of the user obtained by a bank is: Xiao Wang took out a loan in the amount of 50,000 Yuan from Bank M in 2018 but failed to repay the loan as scheduled.

In some embodiments, the third-party service platform sends the obtained transaction data of the user and the identification information of the user to the blockchain node for user score assessment.

In Step 504, a user score assessment task is executed. In some embodiments, the blockchain node receives the user score assessment request sent by the third-party service platform, and automatically executes the user score assessment task according to a smart contract. Before receiving the user score assessment request, the blockchain node further needs to create a second smart contract. The creating the second smart contract and writing the second smart contract into a blockchain network may be implemented, for example, by the following steps: obtaining transaction data of users, and determining user score assessment rules according to the transaction data; creating the second smart contract according to the user score assessment rules, and submitting the second smart contract signed with a private key into a blockchain network; validating the second smart contract submitted into the blockchain network; and when the validation of the second smart contract is successful, consolidating the second smart contract into a block, and broadcasting the block to the entire network. In some embodiments, the user score assessment rules may be determined before the transaction data is received. For example, a plurality of assessment rules may be obtained from third party service providers from the same industrial sector, e.g., medical service providers, or loan service providers. These rules may be constructed into the second smart contract to determine a user score change for a user in response to an input transaction data of the user.

In some embodiments, a user score assessment rule is determined according to the transaction data associated with a user. Continually taking the third-party service platform being a bank as an example, if the transaction data of the user is: Xiao Wang took out a loan in the amount of 50,000 Yuan from Bank M in 2018 but failed to repay the loan as scheduled, then the credit level of the user needs to be decreased, and a particular decreasing amplitude of credit level is determined according to particular content of the transaction data of the user. The second smart contract is created according to the user score assessment rule, and the second smart contract is written into the blockchain network.

In some embodiments, the user score assessment process by the blockchain node may be implemented, for example, by the following steps: receiving the user score assessment request; executing the level assessment task when an execution condition of the second smart contract in the blockchain node is satisfied, and generating a corresponding execution result; and carrying out level update for the user based on the execution result.

In some embodiments, the second smart contract in the blockchain node is used for calculating an amplitude of change of the user score. The blockchain node automatically processes the transaction data of the user according to a user score assessment rule preset in the second smart contract when the execution condition of the second smart contract is satisfied, generates a result of level change of the user, and carries out level update for the user according to the result of level change of the user.

In Step 506, the user score is updated according to the execution result. In some embodiments, the blockchain node is further configured to obtain the identification information and transaction data of the user in the user score assessment request, automatically process the transaction data of the user according to a user score assessment rule when the execution condition of the second smart contract in the blockchain node is satisfied, generate a result of level change of the user, and carry out level update for the user according to the result of level change of the user.

In some embodiments, the user score assessment rules are deployed in the form of the second smart contract in the blockchain. If an automatic execution condition of the second smart contract is satisfied, the user score assessment task may be automatically executed, which effectively improves the efficiency of the user score assessment process, ensures the reliability of the user score assessment system, and also ensures the timeliness of user score update.

In some embodiments, a computing device is further provided, comprising a memory, a processor, and a computer instruction stored on the memory and executable on the processor, wherein the processor, when executing the instruction, implements steps of the above-described blockchain-based application review method.

In some embodiments, a computer readable storage medium storing a computer instruction is further provided, wherein the instruction, when being executed by a processor, implements steps of the above-described blockchain-based application review method.

An exemplary solution of the computer readable storage medium according to some embodiments is described above. It should be noted that the technical solution of the storage medium and the technical solution of the above-described blockchain-based data processing method belong to the same concept. For any details of the technical solution of the storage medium that are not described in detail, the above description of the technical solution of the blockchain-based application review method may be referenced.

Particular embodiments of the specification are described above, and other embodiments fall within the scope of the appended claims. In some cases, actions or steps stated in the claims may be executed in an order different from those in the embodiments and can still achieve desired results. In addition, a process depicted in the accompanying drawings does not necessarily require the illustrated particular order or continuous order to achieve desired results. In some implementation manners, multi-task processing and parallel processing may be feasible or may be beneficial.

The computer instruction comprises computer program codes, and the computer program codes may be in the form of source code, object code, executable file or some intermediate forms. The computer readable medium may include any entity or device capable of comprising the computer program codes, a record medium, a USB stick, a portable hard drive, a magnetic disk, an optical disc, a computer memory, a Read Only Memory (ROM), a Random-Access Memory (RAM), an electric carrier wave signal, a telecommunication signal, and a software distribution medium. It should be noted that the content contained in the computer readable medium may be properly added or deleted as required by legislative and patent practices in the jurisdictions. For example, in some jurisdictions, the computer readable medium does not include electric carrier wave signals or telecommunication signals according to legislative and patent practices.

It should be noted that, for simple description, the above-described method embodiments are all expressed as a series of action combinations. However, those skilled in the art should be aware that the present application is not limited by the described order of actions, as according to the present application, some steps may be implemented in other orders or simultaneously. Second, those skilled in the art should also be aware that all the embodiments described in the specification are preferred embodiments, and not all the involved actions and modules are necessarily required by the present application.

The above embodiments are described with various focuses. For a part of an embodiment that is not described in detail, the relevant description of other embodiments may be referenced.

The preferred embodiments of the present application disclosed above are merely used to help describe the present application. Optional embodiments do not thoroughly describe all details or limit the specification only to the described exemplary implementation manners. Obviously, many modifications and variations may be made according to the content of the specification. The specification selects and describes these embodiments in detail for the purpose of better explaining principles and exemplary applications of the present application, so that those skilled in the art can better understand and use the present application.

The invention claimed is:

1. A computer-implemented method for blockchain-based product-purchasing application review, wherein the application review comprises automatically underwriting a product to be purchased by a user, comprising:

obtaining, by a blockchain node of a blockchain network providing a distributed data storage and comprising a plurality of blockchain nodes, a plurality of underwriting rules associated with a plurality of products offered for sale by a plurality of product providers, each underwriting rule comprising a user score required for user eligibility to purchase a corresponding product, wherein each blockchain node of the blockchain network comprises a data structure for storing and validating transactions associated with users of the network, wherein the blockchain node is in electronic communication with one or more transaction end computing devices associated with one or more providers which in turn is in electronic communication with a computing device associated with the user;

constructing, by the blockchain node, a first smart contract based on the plurality of underwriting rules associated with the plurality of products and the plurality of providers;

obtaining, by the blockchain node, a plurality of assessment rules associated with the plurality of providers to calculate an initial user score of the user based on historical transaction data of the user;

constructing, by the blockchain node, a second smart contract based on the plurality of assessment rules;

signing, by the blockchain node, the first smart contract and the second smart contract respectively with a private key of the blockchain node and submitting the signed first smart contract and the signed second smart contract to the blockchain network;

after the first smart contract and the second smart contract are validated based on a public key of the blockchain node, broadcasting, by the blockchain node, the first smart contract and the second smart contract to the blockchain network;

receiving, by the blockchain node, transaction data of the user from a third party service provider, wherein the receiving comprises receiving a request from the third party service provider to update the initial user score based on the received transaction data, wherein the user's transaction data is different at least in part from the user's historical transaction data;

determining, by the blockchain node executing the second smart contract, an updated user score for the user based on the user's transaction data;

storing, by the blockchain node, the updated user score of the user in the blockchain network, wherein the user score of the user is indexed based on identification information of the user, wherein the user score is continually updated and stored as new transaction data is received by the blockchain node from a third party service provider;

receiving, by the blockchain node, from the transaction end, a first product-purchasing application review request comprising the identification information of the user and first product information of a first target product offered for sale by a first provider, wherein the first product-purchasing application review request is received by the transaction end from the user computing device;

retrieving, by the blockchain node, the updated user score of the user based on the identification information of the user in the first product-purchasing application review request;

generating, by the blockchain node executing the first smart contract, a first review result based on the retrieved updated user score of the user and the first product information of the first target product in the first product-purchasing application review request;

communicating the first review result to the transaction end which in turn notifies the user computing device;

receiving, by the blockchain node, a second product-purchasing application review request comprising the identification information of the user and second product information of a second target product, wherein the second target product is offered for sale by a second provider different from the first provider;

retrieving, by the blockchain node, the updated user score based on the identification information of the user in the second product-purchasing application review request;

generating, by the blockchain node executing the first smart contract, a second review result based on the retrieved updated user score of the user and the second product information of the second target product in the second product-purchasing application review request; and communicating the second review result to the transaction end which in turn notifies the user computing device.

2. The method according to claim 1, wherein broadcasting the second smart contract to the blockchain network comprises:

consolidating the second smart contract into a block and broadcasting the block to the blockchain network.

3. The method according to claim 2, wherein determining the updated user score for the user based on the user's transaction data comprises:

determining if an execution condition of the second smart contract is satisfied;

if so, automatically processing the user's transaction data according to the one or more assessment rules to generate a user-score change for the user, wherein the user-score change implies an amplitude of score increase or score decrease;

retrieving the initial user score of the user from the blockchain network;

determining the updated user score of the user based on the initial user score and the user-score change; and storing the updated user score in the blockchain network, the updated user score being retrievable based on the identification information of the user.

4. The method according to claim 1, further comprising:

determining if the first product information of the first target product satisfies an execution condition of the first smart contract.

5. The method according to claim 1, wherein generating the first review result based on the retrieved updated user score of the user and the first product information of the first target product in the first product-purchasing application review request comprises:

determining, by the blockchain node executing the first smart contract, the user score required to purchase the first target product based on the first product information of the first target product in the first product-purchasing application review request; and generating, by the blockchain node executing the first smart contract, the first review result based on a comparison of the retrieved updated user score with the user score required to purchase the first target product.

6. The method according to claim 1, wherein the method further comprises:

monitoring whether a state machine, an event and/or a trigger condition in the first smart contract satisfies a preset execution condition, and if yes, an execution condition of the first smart contract is satisfied.

7. The method according to claim 1, wherein the method further comprises:

monitoring whether a state machine, an entity and/or a trigger condition in the second smart contract satisfies a preset execution condition, and if yes, an execution condition of the second smart contract is satisfied.

8. The method according to claim 1, wherein the first review result comprises an approval, and the method further comprises:

sending a purchasing request to a server of the first provider, the purchasing request comprising the identification information of the user and an identification information of the first target product; and receiving a purchase confirmation from the server of the first provider.

9. The method according to claim 1, wherein the first review result comprises a rejection.

10. A system for blockchain-based product-purchasing application review, wherein the application review comprises automatically underwriting a product to be purchased by a user, the system comprising: a processor and a non-transitory computer-readable storage medium storing instructions executable by the processor to cause the system to perform operations comprising:

obtaining, by a blockchain node of a blockchain network providing a distributed data storage and comprising a plurality of blockchain nodes, a plurality of underwriting rules associated with a plurality of products offered for sale by a plurality of product providers, each underwriting rule comprising a user score required for user eligibility to purchase a corresponding product, wherein each blockchain node of the blockchain network comprises a data structure for storing and validating transactions associated with users of the network, wherein the blockchain node is in electronic communication with one or more transaction end computing devices associated with one or more providers which in turn is in electronic communication with a computing device associated with the user;

constructing, by the blockchain node, a first smart contract based on the plurality of underwriting rules associated with the plurality of products and the plurality of providers;

obtaining, by the blockchain node, a plurality of assessment rules associated with the plurality of providers to calculate an initial user score of the user based on historical transaction data of the user;

constructing, by the blockchain node, a second smart contract based on the plurality of assessment rules;

signing, by the blockchain node, the first smart contract and the second smart contract respectively with a private key of the blockchain node and submitting the signed first smart contract and the signed second smart contract to the blockchain network;

after the first smart contract and the second smart contract are validated based on a public key of the blockchain node, broadcasting, by the blockchain node, the first smart contract and the second smart contract to the blockchain network;

receiving, by the blockchain node, transaction data of the user from a third party service provider, wherein the receiving comprises receiving a request from the third party service provider to update the initial user score based on the received transaction data, wherein the user's transaction data is different at least in part from the user's historical transaction data;

determining, by the blockchain node executing the second smart contract, an updated user score for the user based on the user's transaction data;

storing, by the blockchain node, the updated user score of the user in the blockchain network, wherein the user score of the user is indexed based on identification information of the user, wherein the user score is continually updated and stored as new transaction data is received by the blockchain node from a third party service provider;

receiving, by the blockchain node, from the transaction end, a first product-purchasing application review request comprising the identification information of the user and first product information of a first target product offered for sale by a first provider, wherein the first product-purchasing application review request is received by the transaction end from the user computing device;

retrieving, by the blockchain node, the updated user score of the user based on the identification information of the user in the product-purchasing application review request;

generating, by the blockchain node executing the first smart contract, a first review result based on the retrieved updated user score of the user and the first product information of the first target product in the first product-purchasing application review request;

communicating the first review result to the transaction end which in turn notifies the user computing device;

receiving, by the blockchain node, a second product-purchasing application review request comprising the identification information of the user and second product information of a second target product, wherein the second target product is offered for sale by a second provider different from the first provider;

retrieving, by the blockchain node, the updated user score based on the identification information of the user in the second product-purchasing application review request;

generating, by the blockchain node executing the first smart contract, a second review result based on the retrieved updated user score of the user and the second product information of the second target product in the second product-purchasing application review request; and communicating the second review result to the transaction end which in turn notifies the user computing device.

11. The system of claim 10, wherein broadcasting the second smart contract to the blockchain network comprises:
consolidating the second smart contract into a block and broadcasting the block to the blockchain network.

12. The system of claim 10, wherein determining the updated user score for the user based on the user's transaction data comprises:
determining if an execution condition of the second smart contract is satisfied;
if so, automatically processing the user's transaction data according to the one or more
assessment rules to generate a user-score change for the user, wherein the user-score change implies an amplitude of score increase or score decrease;
retrieving the initial user score of the user from the blockchain network;
determining the updated user score of the user based on the initial user score and the user-score change; and
storing the updated user score in the blockchain network, the updated user score being retrievable based on the identification information of the user.

13. The system of claim 10, wherein generating the first review result based on the retrieved updated user score of the user and the first product information of the first target product in the first product-purchasing application review request comprises:
determining, by the blockchain node executing the first smart contract, the user score required to purchase the first target product based on the first product information of the first target product in the first product-purchasing application review request; and
generating, by the blockchain node executing the first smart contract, the first review result based on a comparison of the retrieved updated user score with the user score required to purchase the first target product.

14. The system of claim 10, wherein the first review result comprises an approval, and the operations further comprise:
sending a purchasing request to a server of the first provider, the purchasing request comprising the identification information of the user and an identification information of the first target product; and
receiving a purchase confirmation from the server of the first provider.

15. The system of claim 10, wherein the first review result comprises a rejection.

16. A non-transitory computer-readable storage medium for blockchain-based product-purchasing application review, wherein the application review comprises automatically underwriting a product to be purchased by a user, the non-transitory computer-readable medium configured with instructions executable by one or more processors to cause the one or more processors to perform operations comprising:
obtaining, by a blockchain node of a blockchain network providing a distributed data storage and comprising a plurality of blockchain nodes, a plurality of underwriting rules associated with a plurality of products offered for sale by a plurality of product providers, each underwriting rule comprising a user score required for user eligibility to purchase a corresponding product, wherein each blockchain node of the blockchain network comprises a data structure for storing and validating transactions associated with users of the network, wherein the blockchain node is in electronic communication with one or more transaction end computing devices associated with one or more providers which in turn is in electronic communication with a computing device associated with the user;

constructing, by the blockchain node, a first smart contract based on the plurality of underwriting rules associated with the plurality of products and the plurality of providers;

obtaining, by the blockchain node, a plurality of assessment rules associated with the plurality of providers to calculate an initial user score of the user based on historical transaction data of the user;

constructing, by the blockchain node, a second smart contract based on the plurality of assessment rules;

signing, by the blockchain node, the first smart contract and the second smart contract respectively with a private key of the blockchain node and submitting the signed first smart contract and the signed second smart contract to the blockchain network;

after the first smart contract and the second smart contract are validated based on a public key of the blockchain node, broadcasting, by the blockchain node, the first smart contract and the second smart contract to the blockchain network;

receiving, by the blockchain node, transaction data of the user from a third party service provider, wherein the receiving comprises receiving a request from the third party service provider to update the initial user score based on the received transaction data, wherein the user's transaction data is different at least in part from the user's historical transaction data;

determining, by the blockchain node executing the second smart contract, an updated user score for the user based on the user's transaction data;

storing, by the blockchain node, the updated user score of the user in the blockchain network, wherein the user score of the user is indexed based on identification information of the user, wherein the user score is continually updated and stored as new transaction data is received by the blockchain node from a third party service provider;

receiving, by the blockchain node, from the transaction end, a first product-purchasing application review request comprising the identification information of the user and first product information of a first target product offered for sale by a first provider, wherein the first product-purchasing application review request is received by the transaction end from the user computing device;

retrieving, by the blockchain node, the updated user score of the user based on the identification information of the user in the first product-purchasing application review request;

generating, by the blockchain node executing the first smart contract, a first review result based on the retrieved updated user score of the user and the first product information of the first target product in the first product-purchasing application review request;

communicating the first review result to the transaction end which in turn notifies the user computing device;

receiving, by the blockchain node, a second product-purchasing application review request comprising the identification information of the user and second product information of a second target product, wherein the second target product is offered for sale by a second provider different from the first provider;

retrieving, by the blockchain node, the updated user score based on the identification information of the user in the second product-purchasing application review request;

generating, by the blockchain node executing the first smart contract, a second review result based on the retrieved updated user score of the user and the second product information of the second target product in the second product-purchasing application review request; and communicating the second review result to the transaction end which in turn notifies the user computing device.

17. The non-transitory computer-readable storage medium of claim 16, wherein broadcasting the second smart contract to the blockchain network comprises:
consolidating the second smart contract into a block and broadcasting the block to the blockchain network.

18. The non-transitory computer-readable storage medium of claim 16, wherein determining the updated user score for the user based on the user's transaction data comprises:
determining if an execution condition of the second smart contract is satisfied;
if so, automatically processing the user's transaction data according to the one or more assessment rules to generate a user-score change for the user, wherein the user-score change implies an amplitude of score increase or score decrease;
retrieving the initial user score of the user from the blockchain network;
determining the updated user score of the user based on the initial user score and the user-score change; and
storing the updated user score in the blockchain network, the updated user score being retrievable based on the identification information of the user.

19. The non-transitory computer-readable storage medium of claim 16, wherein the first review result comprises an approval, and the operations further comprise:
sending a purchasing request to a server of the first provider, the purchasing request comprising the identification information of the user and an identification information of the first target product; and
receiving a purchase confirmation from the server of the first provider.

20. The non-transitory computer-readable storage medium of claim 16, wherein generating the first review result based on the retrieved updated user score of the user and the first product information of the first target product in the first product-purchasing application review request comprises:
determining, by the blockchain node executing the first smart contract, the user score required to purchase the first target product based on the first product information of the first target product in the first product-purchasing application review request; and
generating, by the blockchain node executing the first smart contract, the first review result based on a comparison of the retrieved updated user score with the user score required to purchase the first target product.

\* \* \* \* \*